H. L. WHITMAN.
CORN-SHELLER.
No. 175,888. Patented April 11, 1876.
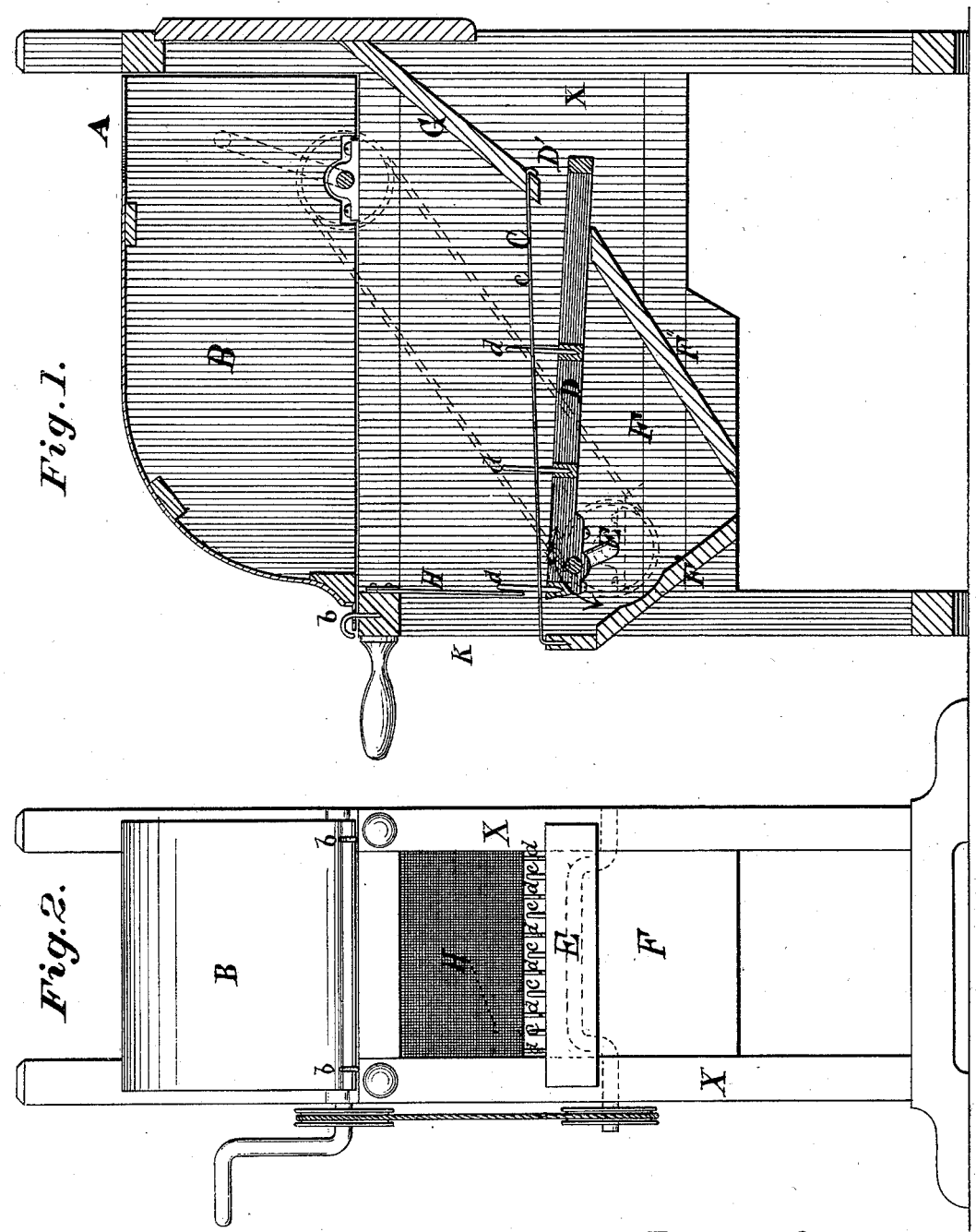

UNITED STATES PATENT OFFICE.

HENRY L. WHITMAN, OF ST. LOUIS, MISSOURI.

IMPROVEMENT IN CORN-SHELLERS.

Specification forming part of Letters Patent No. 175,888, dated April 11, 1876; application filed October 29, 1875.

*To all whom it may concern:*

Be it known that I, HENRY L. WHITMAN, of St. Louis, in the county of St. Louis and State of Missouri, have invented certain Improvements on Corn-Shellers, of which the following is a specification:

My invention relates to cob-rakes for corn-shellers, and has for its object the quick and easy separation of the cobs from the corn. To this end I employ a reciprocating rake provided with teeth or pins, which project through a slotted platform and sweep off the cobs, the corn falling through the slots into a receptacle below.

Figure 1 is a vertical longitudinal section of my machine; and Fig. 2 is an end view, showing the end at which the cobs are delivered.

The corn and cobs are introduced at A from the shelling mechanism, and, falling down, are guided by an incline, G, onto a platform, C, composed of slats c, which arrest the cobs. The corn falls through the slots between the slats into a hopper, F, and thence into any convenient receptacle. D is a rake, one end of which reciprocates in a slide, D', the other end being attached to a crank, E, revolving in the direction indicated by the arrow. During the upper half-revolution of the crank the teeth d of the rake D project through the platform c, and, the rake being carried forward by the crank, rake off the cobs, throwing them out at K. During the lower half-revolution of the crank the rake is depressed, so that its teeth no longer project through the platform, and is carried back to begin the raking again.

H is a hinged flap, which may be made of some textile fabric.

The cover B is hinged at b for convenience in getting at the interior of the machine. The end of the cover is rounded off, the advantages of which are obvious.

The opposite end of the rake from that to which the crank or other operating mechanism is attached may move in a guide in the rear, or be supported upon a corresponding crank, or pivot, or link, or by other suitable means, so as to allow greater vertical play than is secured by the guide.

The machine may be so arranged as to discharge from either end, as may be most convenient.

Any ordinary machinery for shelling corn may be placed within the cover B above the platform D, said cover being so varied in shape or size as the character of this machinery may require; or the corn and cobs, after passing through the shelling-machinery, may be introduced into a hopper or trough-way at A, and thus conducted to the slotted platform.

Having thus described my invention, I claim—

1. A mechanism for separating the corn from the cob after the same has passed through the shelling apparatus of any machine for shelling corn, said mechanism consisting of the slotted platform C, reciprocating rake D, and crank E, combined and operating substantially as described.

2. A corn-shelling machine provided with a slotted platform so arranged in connection with the shelling mechanism as to receive the corn and cob as they pass from said shelling mechanism, and having a reciprocating rake, operating with a crank movement to carry off and discharge the cobs, substantially as described.

HENRY L. WHITMAN.

Attest:
W. B. HORNER,
NELSON G. EDWARDS.